United States Patent
Lynch

[15] 3,690,101
[45] Sept. 12, 1972

[54] GROUND FOR FIBERGLASS SOLID ROCKET MOTOR CASE

[72] Inventor: Charles L. Lynch, Rockledge, Fla.

[73] Assignee: The United States of America as represented by the Secretary of the Army

[22] Filed: Sept. 17, 1970

[21] Appl. No.: 72,915

[52] U.S. Cl. .................................................60/255
[51] Int. Cl. ...............................................F02k 9/04
[58] Field of Search......60/255, 253, 39.47, 39.09 R; 102/28 S, 43 P

[56] References Cited

UNITED STATES PATENTS

| | | | |
|---|---|---|---|
| 3,017,746 | 1/1962 | Kiphart | 60/255 |
| 3,555,816 | 1/1971 | Leasure et al. | 60/255 X |
| 3,023,576 | 3/1962 | Musgrave | 60/39.47 |
| 2,748,701 | 6/1956 | Barrows | 102/43 P |
| 2,479,828 | 8/1949 | Geckler | 60/255 |
| 2,762,193 | 9/1956 | Johnson | 60/255 |
| 2,995,011 | 8/1961 | Kimmel | 60/255 |
| 2,974,476 | 3/1961 | Fox | 60/39.47 X |

OTHER PUBLICATIONS

Daboo, J. E., Solid Fuel Rocket Propulson, Temple Press Books, London, 1962, pp. 52–59.

Silsbee, Francis " Static Electricity" U.S. Bureau of Standards Circular No. C438, 1942, pp. 11–15

*Primary Examiner*—Carlton R. Croyle
*Assistant Examiner*—Robert E. Garrett
*Attorney*—Harry M. Saragovitz, Edward J. Kelly, Herbert Berl and Jack W. Voigt

[57] ABSTRACT

Means for grounding an electrostatic charge from within a fiberglass case of a solid propellant rocket motor are provided. The rocket motor utilizes a solid propellant grain within a fiberglass case which is provided with a metalic dome ring at the forward end of the case. A metallic aft retainer ring for the grain is positioned between the grain and an exhaust nozzle which is affixed to the aft-end of the case. The exhaust nozzle is in electrical contact with the retainer ring and the case. A conductive path to ground is established by a conductive material (e.g., conductive plastic or metallic screen) which is positioned between the propellant grain and the fiberglass case and in electrical contact with an aft-end metallic retainer ring and a forward end metallic-dome ring. The conductive path to ground is established through the fiberglass case itself by employing a conductive material (e.g., powdered carbon or powdered metal) in the epoxy resin used to coat the fiberglass threads in a filament wound fiberglass case. The outside of the motor case is coated with a conductive paint.

4 Claims, 2 Drawing Figures

PATENTED SEP 12 1972

3,690,101

Charles L. Lynch,
INVENTOR.

GROUND FOR FIBERGLASS SOLID ROCKET MOTOR CASE

BACKGROUND OF THE INVENTION

The present invention relates to the solid propellant rocket motor field. The invention deals directly with a problem associated with nonmetallic motor cases which contain a propellant grain.

During the course of solid propellant rocket motor development requirements for changes to the three major components: the fuel/oxidizer system or grain, the combustion or thrust chamber or case, and the exhaust nozzle have been interrelated. For example, as more thrust is required, the grain composition is generally comprised of a more energetic grain material which burns to yield higher pressures within the case and higher temperature of gases exiting through the exhaust nozzle. The higher temperatures and pressures have in turn necessitated many improvements to the design and structural material of cases and nozzles.

A solid propellant rocket motor produces high temperature and high pressure gases by burning a solid material the principle ingredients of which are a fuel and oxidizer. The ingredients may be present either in the molecular structure of the solid propellant or they may be separate chemical compounds which are present as a suitable physical mixture. Solid propellants may be segregated into double-base propellants, and composite or heterogenous propellants.

An important criterion for material selection used for fabricating cases or combustion chambers is the strength to weight ratio of the material. Earlier materials selected for case manufacture were high strength steel, such as heat treated 4130 steel. However, the extra energy required to propel a heavy motor case was a significant amount. Hence by reducing the case weight more propulsion energy would be available for delivering a rocket motor for a greater distance and at an increased velocity. Thus, the development of cases made from spun fiberglass bonded with an epoxy resin was recognized as a significant contribution to the advancement of the rocket motor case art.

The development of nonmetallic rocket motor cases, such as the laminated fiberglass-epoxy resin case, resulted in a considerable weight reduction of the motor which in turn resulted in a higher fuel to motor weight ratio. The higher fuel to motor weight ratio lead to more useable power, greater rocket range, increased velocity, etc.

A major problem associated with solid propellant rocket motors utilizing a fiberglass case is the build up of high electrostatic charge (20,000 to 30,000 volts) within the case itself. Due to perhaps minor voids or spaces between the propellant grain and case which resulted from the manufacturing process or shrinkage of the propellant grain after manufacture, there is a difference in potential which becomes established between the motor case and the grain. The tendency to build up electrostatic charge during handling and storing of solid propellant rocket motor requires that solid propellant rocket motors be grounded for safety reasons. Fiberglass being an insulator cannot be grounded so that this high charge can be drained off.

An object of this invention is to provide means for conducting electrostatic charge from a fiberglass solid propellant rocket motor.

A further object is to provide means for conducting electrostatic charge from a fiberglass solid propellant rocket motor case wherein the means is an integral part of the fiberglass rocket motor case.

Another object is to provide means for conducting electrostatic charge from a fiberglass solid rocket motor case fabricated prior to casting of grain wherein the grain is provided with a wrapping of conductive material prior to inserting into the motor case.

Still, another object is to provide means for conducting electrostatic charge from a fiberglass solid rocket motor case fabricated prior to casting of grain wherein a conductive material is placed on the inside of the case into which the propellant is cast and cured to form a grain.

SUMMARY OF THE INVENTION

Means for grounding an electrostatic charge from within the fiberglass case of a solid propellant rocket motor are provided by placing a conductive plastic or metal screen between the propellant grain and the fiberglass case having an aft-end metallic closure ring and a forward end metallic dome ring or by making the fiberglass case conductive by adding conductive material (e.g., powdered carbon or powdered metals such as iron, aluminum, or silver) to the resin used to coat the fiberglass thread utilized in a filament wound fiberglass case. The fiberglass case is coated on the outer surface with a conductive paint. A conductor is secured to the metallic dome ring to complete a conductive path for the high voltage to ground.

DESCRIPTION OF THE PREFERRED EMBODIMENTS

Figure 1:
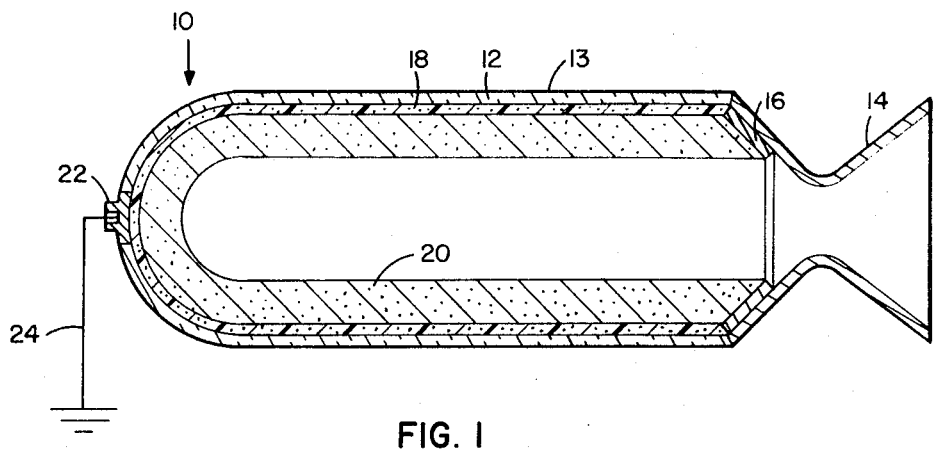
FIG. 1 is a sectional view of a fiberglass case solid propellant rocket motor having a means for grounding located between the propellant grain and the fiberglass case.

With reference to the drawing, FIG. 1, there is shown a solid propellant rocket motor 10 which includes a fiberglass case 12 coated with conductive paint 13. Affixed to the fiberglass case is an exhaust nozzle 14 which is in electrical contact with a metallic aft retainer ring 16 and a conductive material 18 (e.g., conductive plastic or metal screen) which is located between the fiberglass case 12 and the propellant grain 20. The conductive material 18 is in electrical contact with a metallic dome ring 22 to which a conductor 24 is secured for establishing a conductive path to a suitable ground.

Figure 2:
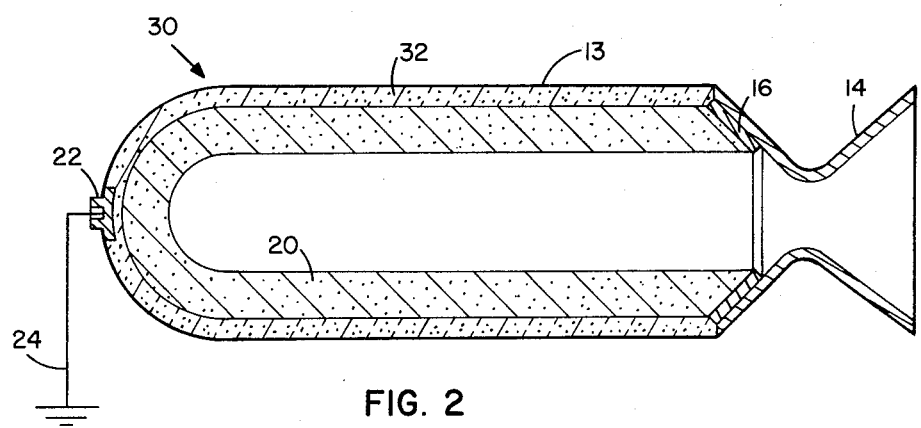
FIG. 2 is a sectional view of a fiberglass case solid propellant rocket motor having a means for grounding located within the fiberglass case per se.

With reference to the drawing, FIG. 2, there is shown a solid propellant rocket motor 30 which includes a conductive fiberglass case 32 coated with conductive paint 13. Like numbers identified in FIG. 1 have been retained in FIG. 2 for the illustration of like components. The fiberglass case 32 illustrated in FIG. 2 was made conductive by employing an additive (e.g., powdered carbon or powdered metal) to the expoxy resin used to coat the fiberglass fibers in the filament wound case.

The embodiment illustrated in FIG. 1 utilizes a conductive plastic or metal screen 18 to provide a conductive path for an accumulated electrostatic charge from within the case itself to a metallic dome ring 22. A suitable conductor to ground 24 is attached to dome ring 22. The conductive plastic or metal screen may be used to wrap a precast propellant grain prior to being provided with a fiberglass case which is provided with a metallic dome ring. A metallic aft-end retainer ring 16 is in electrical contact with the propellant grain 20 and the nozzle 14.

The conductive plastic utilized in this invention is available in sheet form and contains an additive which provides a conductive path such as for electrostatic charge. The insulation properties or high resistance properties of the plastic may be reduced to a point where a conductive path may be established by minor amounts of additives such as powdered carbon or finely divided metals which are incorporated into the plastic during the manufacturing process. Other plastic may be rendered conductive by metallic films or coatings on the outer surfaces.

The conductive plastic or metal screen is placed in a pre-fabricated fiberglass case, and the propellant is poured or cast and cured in the case itself which is provided with a metallic dome ring as previously described. A metallic retainer ring for the propellant is used which also provides electrical conductance between the nozzle (generally metal or fiberglass with or without a carbon liner), the propellant, the fiberglass case coated with conductive paint, and the metallic dome ring to which a conductor is secured for establishing a conductive path to a suitable ground.

The embodiment illustrated in FIG. 2 utilizes certain like components of FIG. 1 to perform described functions. However, this embodiment uses a fiberglass case made conductive by employing an additive of powdered carbon or powdered metal to the epoxy resin used to coat the fiberglass filaments employed in making the case. The case per se establishes the conductive path to ground similarly as does the conductive plastic or metallic screen illustrated in FIG. 1. The plastic case can be prefabricated or it can be made by a case-on propellant technique which is well established in the art. After a suitable conductive layer which is to make electrical contact with the grain is established, additional layers of fiberglass without additive can be used to finish the case winding. After fabrication, the finished motor is covered with a conductive paint 13 on the outer surface.

Considerations of other materials which may be useful to establish the conductive path to ground and the electrical contact with the propellant grain should be made with great care. Although a conductive paint layer applied to the outside of the finished rocket motor serves to drain off surface electrostatic charge to a suitable ground, the use of conductive paint or use of other conductive materials containing a diffusible solvent is not acceptable for use in establishing the ground path on the inside of the rocket motor case. It is essential that an inert material, free of diffusible solvent, be used next to the propellant grain. Otherwise, solvents which may diffuse into the propellant grain or materials which may be reactive with the propellant grain may lead to propellant degradation or propellant failure.

The means for grounding disclosed herein are suitable for grounding rocket motors which employ other non-conductive cases such as the cellulosic type case or moulded plastic cases.

I claim:

1. A solid propellant rocket motor comprising: a propellant grain; a fiberglass case having said propellant grain contained therein, said fiberglass case having a forward end and an aft-end, and said fiberglass case being provided with an exhaust nozzle affixed at the aft-end and a metallic dome ring affixed at the forward end; an aft-end metallic closure ring in electrical contact with said exhaust nozzle, said metallic closure ring being positioned between said propellant grain and said exhaust nozzle to make electrical contact with said grain and said case; and conductive material means for grounding an electrostatic charge from within said fiberglass case, said grounding being effected through said conductive material means that is in electrical contact with said metallic closure ring and said metallic dome ring.

2. The rocket motor as set forth in claim 1 and wherein said conductive material means for grounding consists of a metallic screen for establishing a conductive path to ground, said metallic screen being in electrical contact with said aft-end metallic closure ring, said fiberglass case, and said metallic dome ring, said metallic screen being positioned between said fiberglass case and said propellant grain, said metallic dome ring being in electrical contact with said propellant grain, said metallic dome ring extending to the outside of said motor case, and said case being covered with a conductive paint; and a suitable conductor secured to said metallic dome ring and attached to a suitable ground for completing said conductive path to ground.

3. The rocket motor as set forth in claim 1 and wherein said conductive material means for grounding consists of a conductive plastic for establishing a conductive path to ground, said conductive plastic being in electrical contact with said aft-end metallic closure ring, said fiberglass case, and said metalic dome ring, said conductive plastic being positioned between said fiberglass case and said propellant grain, said metallic dome ring being in electrical contact with said propellant grain, said metallic dome ring extending to the outside of said motor case, and said case being covered with a conductive paint; and a suitable conductor secured to said metallic dome ring and attached to a suitable ground for completing said conductive path to ground.

4. The rocket motor as set forth in claim 1 and wherein said conductive material means for grounding consists of a conductive fiberglass case for establishing a conductive path to ground, said conductive fiberglass case being conductive by means of an additive selected from powdered carbon and powdered metals, said additive being added to epoxy resin used in coating the fiberglass threads employed in the making of said conductive fiberglass case, and said case being in electrical contact with said aft-end metallic closure ring and said metallic dome ring, said metallic dome ring being in electrical contact with said propellant grain, said metallic dome ring extending to the outside of said motor case, and said case being covered with a conductive paint; and a suitable conductor secured to said metallic dome ring and attached to a suitable ground for completing said conductive path to ground.

* * * * *